United States Patent [19]

Szeremeta

[11] Patent Number: 5,556,117
[45] Date of Patent: Sep. 17, 1996

[54] RUGGED TERRAIN CART

[76] Inventor: George R. Szeremeta, 646 Westminster Dr., Pasadena, Calif. 91105

[21] Appl. No.: 242,744

[22] Filed: May 13, 1994

[51] Int. Cl.⁶ ..................................................... B62B 3/00
[52] U.S. Cl. ....................................... 280/47.11; 280/274
[58] Field of Search .................................. 280/284, 276, 280/202, 288.3, 47.11, 47.13, 274, 264, 242.2, 263, 270, 281.1, 274; 224/30 R

[56] References Cited

U.S. PATENT DOCUMENTS

| | | | |
|---|---|---|---|
| 2,979,338 | 4/1961 | Dwyer | 280/47.3 |
| 2,992,834 | 7/1961 | Tidwell | 280/47.3 |
| 3,034,801 | 5/1962 | Huston | 280/37 |
| 3,236,537 | 2/1966 | Eckman | 280/47.18 |
| 3,243,006 | 3/1966 | Sparks | 280/202 |
| 3,375,024 | 3/1968 | Bowden | 280/288.3 |
| 3,554,311 | 1/1971 | Thompson et al. | 280/288.3 |
| 3,820,807 | 6/1974 | Curran | 280/47.3 |
| 4,050,615 | 9/1977 | Kline | 224/329 |
| 4,444,405 | 4/1984 | Barrus | 280/47.3 |
| 4,869,517 | 9/1989 | Smith | 280/47.3 |

Primary Examiner—Richard M. Camby

[57] ABSTRACT

An improved, attendant propelled cart for the transport of a workload over rugged terrain. The cart has a plurality of ground engaging wheels (52), with a forward ground engaging wheel (18) and a rear ground engaging wheel (64). The ground engaging wheels of the cart are positioned in an approximate in-line wheel arrangement in relation to the normal direction of forward travel in order to provide stability and support the cart, and its workload, fore and aft along the longitudinal plane of the vehicle.

In typical operation, the attendant simply walks beside the rugged terrain cart, while grasping a hand grip set (30) which is mounted on a handle means (36), pushing it along while the cart serves to support the entire weight of the workload. The attendant may easily, efficiently and precisely propel, steer, and maneuver the cart by virtue of said handle means (36), which are interconnected to a rigid forward wheel mounting assembly (72), which mounts said forward ground engaging wheel (18), and interconnects to a rigid frame (74) by a pivot means (50).

The cart has a low center of gravity and enhanced stability by virtue of the large load carrying surface area of the rigid frame (74). An upper load attachment rail (93) and a lower load attachment rail (44) facilitates the attachment and positioning of the workloads, typically self contained carriers, a backpack (12), in a manner which is consistent with this goal. Workloads may also be carried within the rigid frame (74) in a waterproof storage means (98) with access provided by a waterproof access hatch (97).

The rugged terrain cart further has both a brake means (16) and a suspension means (80) which serve to increase the cart's efficiency, safety and comfort in operation.

8 Claims, 5 Drawing Sheets

RUGGED TERRAIN CART

BACKGROUND—FIELD OF INVENTION

This invention relates to a cart, and more particularly, to a cart that is intended for use in hiking, backpacking, camping and the like to facilitate the transportation of heavy loads over narrow trails and rugged terrain.

BACKGROUND—DESCRIPTION OF PRIOR ART

It is known to use pushcarts and the like for the purpose of transporting heavy loads. Carts of this type are shown in the following U.S. Pat. No. 2,979,338 to A. J. Dwyer, U.S. Pat. No. 2,992,834 to E. A. Tidwell et al., U.S. Pat. No. 3,034,801 to B. W. Huston, U.S. Pat. No. 3,236,537 to A. J. Eckman, U.S. Pat. No. 3,820,807 to T. W. Curran, U.S. Pat. No. 4,444,405 to D. M. Barrus, and U.S. Pat. No. 4,869,517 to P. D. Smith. Each of these patents disclose carts which are intended for use in facilitating the transportation of heavy loads over rugged terrain. These carts are utilized as a substitute for conventional backpacks since they permit heavier loads to be carried with greater ease. A typical cart can easily accommodate a load of one or two hundred pounds when hiking in mountains, forests, and other situations in which rugged terrain is encountered.

The popularity of hiking and camping and the foregoing availability of a multitude of items for enhancing the comfort of trips into recreational areas creates problems regarding the transport of supplies into remote areas. The common practice is to carry all such supplies in backpacks, or where available, on pack animals. Backpacks have been improved to the extent that they can be used to support larger loads. However, the weight of the supplies is still supported by the hiker. This is burdensome and often constitutes a limitation on distances which can be traveled with comfort over a given period of time. Pack animals can be used to transport heavier loads. However, they must be fed and are expensive to rent or care for. In some areas, they are not allowed.

The presently available carts have found only limited use due to their design deficiencies. Some of the carts are cumbersome and are often more of hindrance than a help for use in rugged terrain. Some of the presently available carts which are relatively easy to maneuver are not able to carry sufficient loads to make their use worthwhile. Some of the carts have insufficient rigidity or stability. Others have an excessively high center of gravity which reduces their usefulness in carrying heavy loads. Other carts have designs which permit their wheels to easily become intertwined with their loads or brush and tree branches.

The presently available carts each employ a configuration with only a single ground engaging wheel positioned along the longitudinal plane of the cart. All of these carts, by virtue of their flawed design, require the attendant to exert a burdensome force in order to support and balance the cart, and the weight of its load, fore and aft or lengthwise along the longitudinal plane. The hardship that this burdensome force places on the attendant is also greatly increased when traversing rough, uneven or broken ground of the type that one would expect to encounter in rugged terrain.

An ideal cart would be stable and support its load fore and aft along the longitudinal plane of the vehicle. It would further maximize the volume and weight of the supplies that can be carried, have a high degree of maneuverability, exhibit ease and precision in steering, provide the attendant with an efficient position of operation and propulsion, provide a low center of balance, and offer good stability and ease of use when transporting heavy loads. It is currently a problem that a cart having all of these traits is not currently available.

OBJECTS AND ADVANTAGES

Accordingly, several objects and advantages of my invention are presented in the following paragraphs.

The present invention overcomes the foregoing discussed problems and provides an advancement in the art by providing a cart with a plurality of ground engaging wheels positioned in an approximate in-line arrangement along the longitudinal plane of the vehicle. This unique multi-wheel arrangement provides longitudinal stability which supports the cart and the weight of its workload thereby relieving the attendant of the load that would otherwise be placed on the user's hands, arms and back. The result is one of freeing the attendant from the hardships associated with the burdensome force that would otherwise be required to support and balance the cart and the weight of its workload.

The cart is further advantageous in that it has a low center of gravity and enhanced stability by means of its design which purposefully attaches and positions its workload in a manner which is consistent with this goal. A low center of gravity is crucially important since it makes the cart significantly easier to use when heavy loads are carried.

The cart of the present invention is further advantageous in that the rigid frame of its design serves to protect the workload or brush and tree branches from becoming intertwined in a ground engaging wheel. Additionally, the large load carrying surface area of the cart's rigid frame is fully functional and advantageous in respect to the attachment and transportation of a large volume of supplies.

The cart is further advantageous in that it provides a high degree of maneuverability, ease and precision in steering, and an efficient position of operation and propulsion for the attendant. This goal is accomplished by virtue of a unique rigid forward wheel mounting assembly and a handle means adapted to be grasped by the hands of the attendant.

In summary, the provision of the cart of the present invention provides a cart that overcomes the above discussed disadvantages of the prior art and thereby provides apparatus which permits heavier loads to be pushed more easily over rugged terrain. Further objects and advantages of my invention will become apparent from a consideration of the drawings and ensuing description.

DRAWING FIGURES

Figure 1:
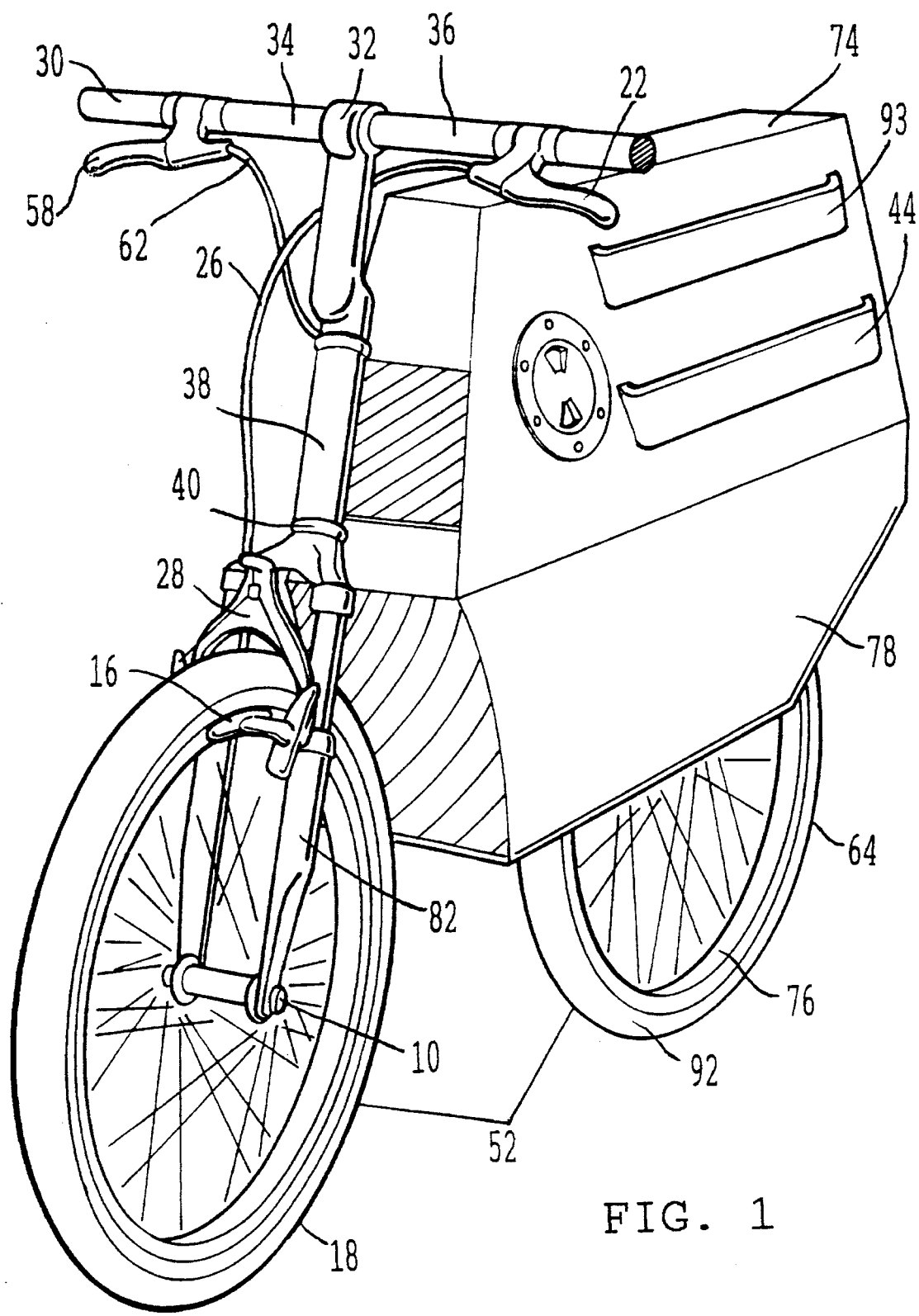
FIG. 1 is a perspective drawing which highlights the left side of the rugged terrain cart, as seen from a forward point of observation, showing the handle means, by which the attendant propels and maneuvers the vehicle, and the waterproof access hatch which is located in the left side frame member in order to access the waterproof storage means contained within the rigid frame.

REFERENCE NUMERALS IN DRAWINGS 10 axle
12 backpack
14 brake engaging means
16 brake means
18 forward ground engaging wheel
20 front brake bosses
22 front brake lever assembly
24 front cantilever brake
26 front brake control cable
28 front fork brace
30 hand grip set
32 handle bar stem
34 handle bar
36 handle means
38 head tube
40 headset
42 left side frame member
44 lower load attachment rail
46 lower shock absorber mounting bolt assembly
48 lower shock absorber mounting point
50 pivot means
52 plurality of ground engaging wheels
54 rear brake bosses
56 rear brake cable mount
58 rear brake lever assembly
60 rear cantilever brake
62 rear brake control cable
64 rear ground engaging wheel
66 rear wheel shock absorber
68 rear wheel swingam
70 right side frame member
72 rigid forward wheel mounting assembly
74 rigid frame
76 rim
78 rugged terrain cart
80 suspension means
82 suspension front fork
84 swingarm bolt
86 swingarm flange bearing
88 swingarm pivot point mount
89 swingarm pivot point mount reinforcing pad
90 swingarm plain cylindrical bearing
91 swingarm thrust bearing
92 tire
93 upper load attachment rail
94 upper shock absorber mounting bolt assembly
95 upper shock absorber mounting point
96 upper shock absorber mounting point reinforcing pad
97 waterproof access hatch
98 waterproof storage means Description—FIGS. 1 to 5

FIG. 1 is perspective drawing which highlights the left side of a preferred embodiment of my invention, a rugged terrain cart 78. As is shown in this drawing, the cart of this invention has a plurality of ground engaging wheels 52, with the preferred embodiment having two ground engaging wheels, specifically with a forward ground engaging wheel 18 and a rear ground engaging wheel 64.

Figure 2:
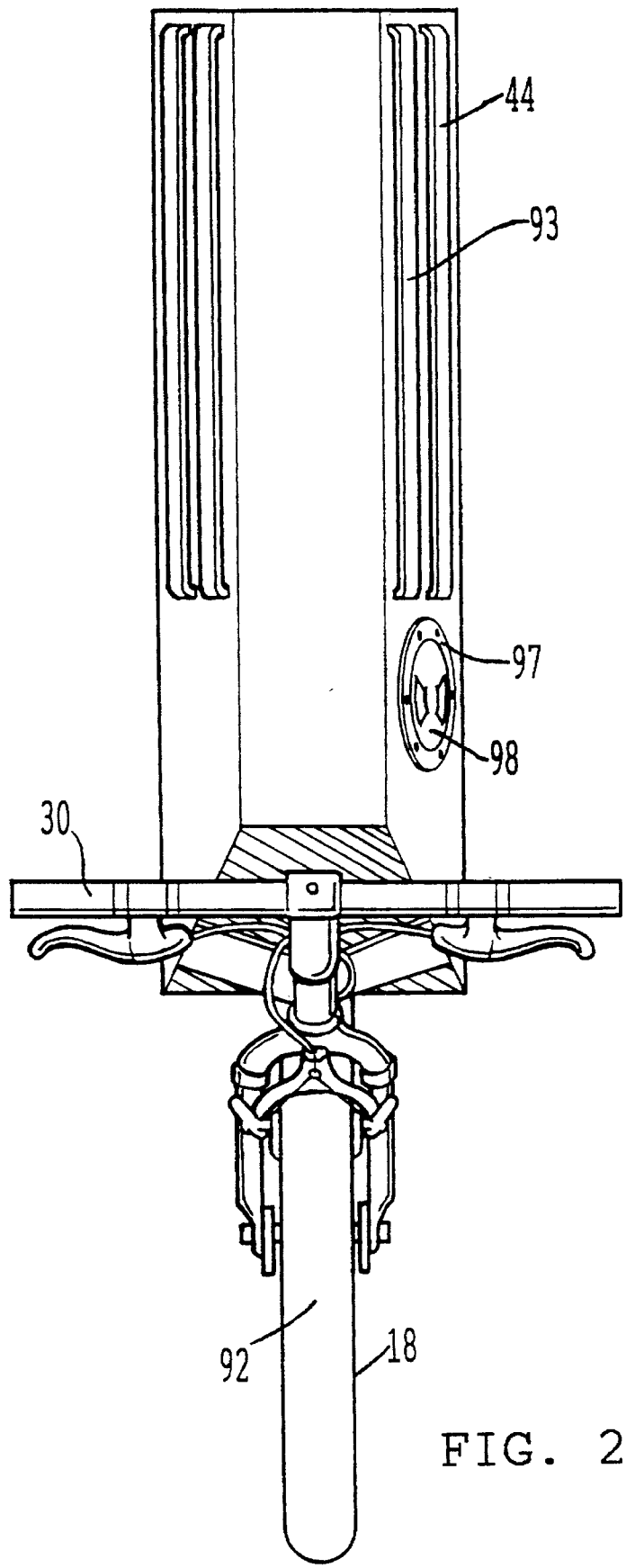
FIG. 2 is a top view of the rugged terrain cart which assists in illustrating the approximate in-line position of the cart's plurality of ground engaging wheels along the longitudinal plane of the vehicle.
Figure 3:
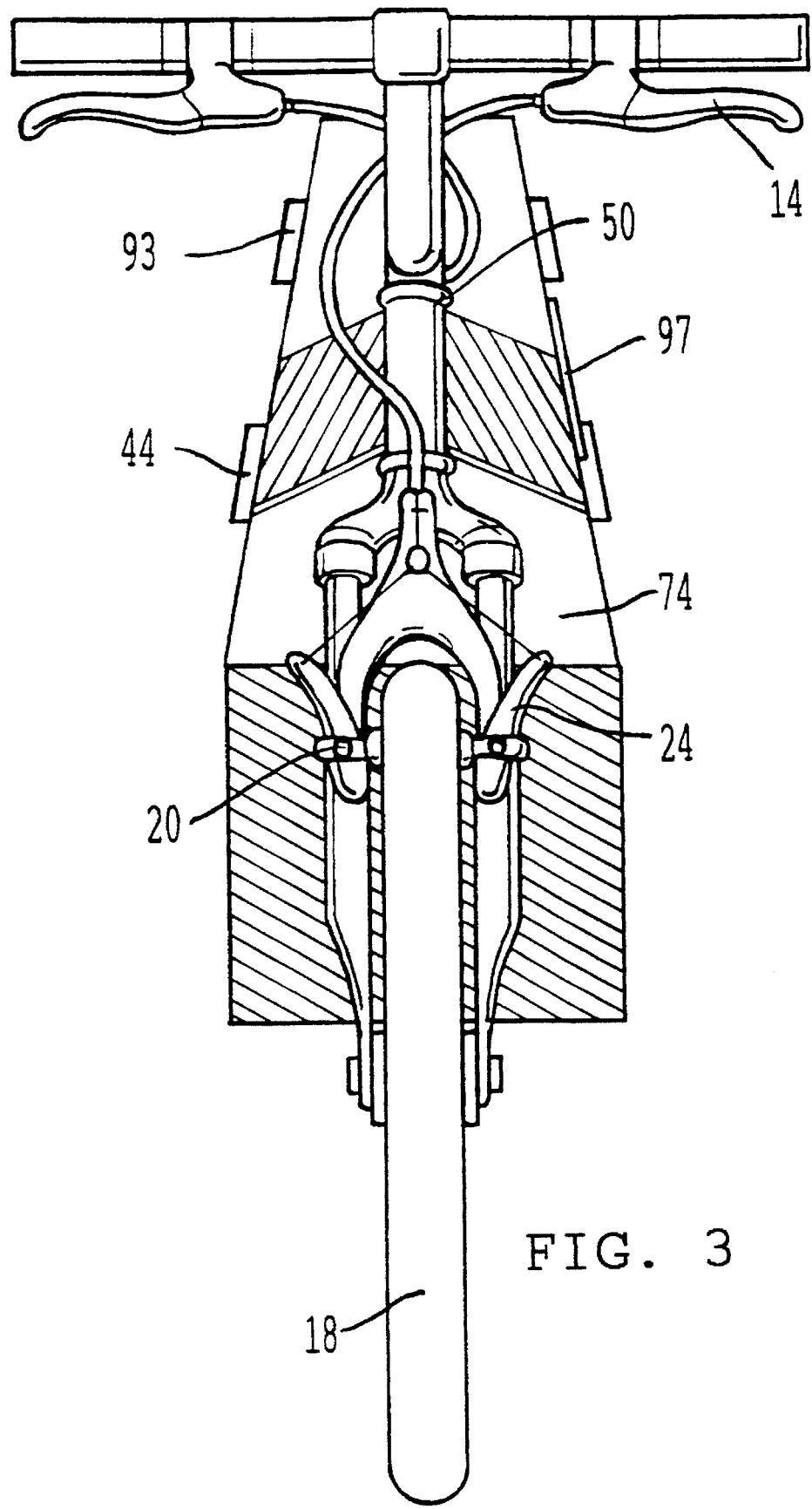
FIG. 3 is a front view of the rugged terrain cart which again shows the approximate in-line position of the cart's plurality of ground engaging wheels.

FIG. 2, a top view drawing, and FIG. 3, a front view drawing, best show that the plurality of ground engaging wheels 52 are arranged in an approximate in-line wheel position in relation to the normal direction of forward travel.

As is best shown in FIG. 1, in the preferred embodiment of the rugged terrain cart 78, the forward ground engaging wheel 18, is of a mountain bicycle type with a rim 76 and a tire 92 and an axle 10. The forward ground engaging wheel 18 is mounted by said axle 10 to a suspension front fork 82, of the type typically found on a modern mountain bicycle. The suspension front fork 82 satisfies the roles of a rigid forward wheel mounting assembly 72 and that of a suspension means 80 for the forward ground engaging wheel 18. The axle 10 may be affixed to the suspension front fork 82 by means of any suitable means such as for example by means of a threaded nut.

A front cantilever brake 24, of the type typically found on a modern mountain bicycle, is mounted to the suspension front fork 82 by means of a front brake bosses 20 arrangement, which also is of the type found on a modern mountain bicycle, being incorporated into the structure of the front fork. The front cantilever brake 24 satisfies the role of a brake means 16 for the forward ground engaging wheel 18.

A front fork brace 28, of the type typically incorporated into a suspension front fork 82, provides a mount for the lower portion of a front brake control cable 26.

The suspension front fork 82 interconnects the forward ground engaging wheel 18 to a rigid frame 74 by means of a headset 40 of the type typically found on modern mountain bicycles. In this, the preferred embodiment of my invention, the headset 40 satisfies the role of a pivot means 50.

In assembly, the upper portion of the suspension front fork 82 passes up through the headset 40, which mounts within a head tube 38 of the type typically employed on a modern mountain bicycle, which is incorporated into the forward structure of the rigid frame 74 by welding means. Once the upper portion of the suspension front fork 82 passes through the headset 40, it is securely fastened by a handle bar stem 32 of the type typically employed on a modern mountain bicycle.

The handle bar stem 32 provides a mount for a handle bar 34, also of the type typically found on a modern mountain bicycle.

In the preferred embodiment of my invention, the handle bar 34 satisfies the role of a handle means 36. The handle bar 34 provides a mount for a hand grip set 30, a front brake lever assembly 22, and a rear brake lever assembly 58, with each being positioned in a manner which is consistent with that found on a modern mountain bicycle.

The front brake lever assembly 22 and the rear brake lever assembly 58 each satisfy the role of a brake engaging means 14.

In the preferred embodiment of my invention, the rigid frame 74 is a completely welded rigid structure of aluminum alloy plate and other aluminum alloy forms such as tubing, bar, and angle. This uni-body, monocoque structure optimizes lightness of weight while providing the essential quality of rigidity. Within the rigid frame 74, a sealed interior compartment serves as a waterproof storage means 98 with accessibility provided by a waterproof access hatch 97, of a marine type, which is installed in a left side frame member 42 of the rigid frame 74.

Figure 4:
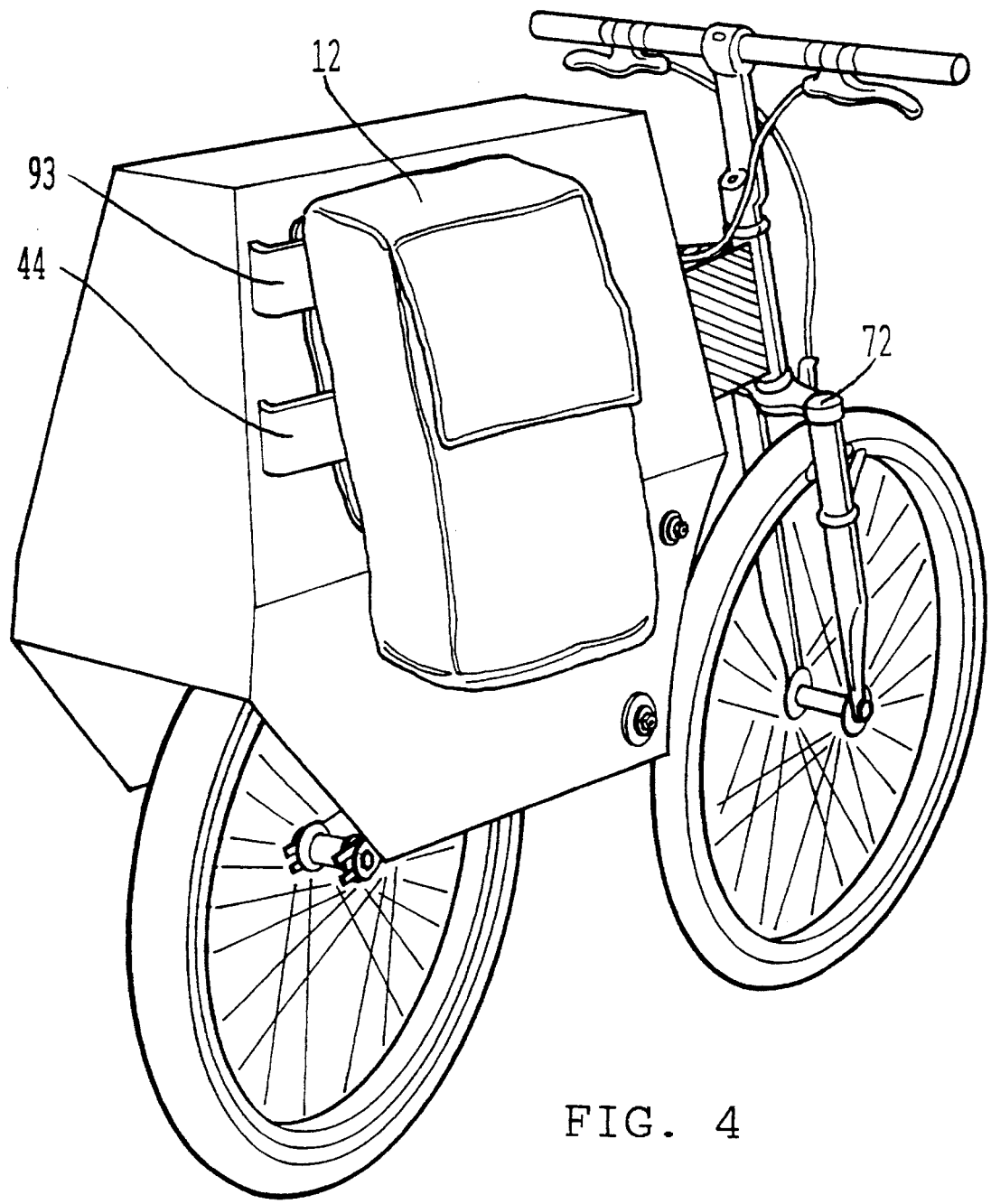
FIG. 4 is a perspective drawing highlighting the right side of the rugged terrain cart, as seen from a rear point of observation, showing the cart with a workload, a backpack, lashed to an upper load attachment rail and a lower load attachment rail, both of which being mounted to the right side frame member of the rigid frame.

FIG. 4 is a perspective drawing which highlights the right side of a preferred embodiment of my invention and shows a workload, a backpack 12, lashed to an upper load attachment rail 93 and a lower load attachment rail 44. Each of the two load attachment rails consist of a set of right side and left side members which are constructed of aluminum plate. The upper and lower load attachment rails are attached on both the right side frame member 70 and the left side member 42 of the rigid frame 74 by welding means.

Figure 5:
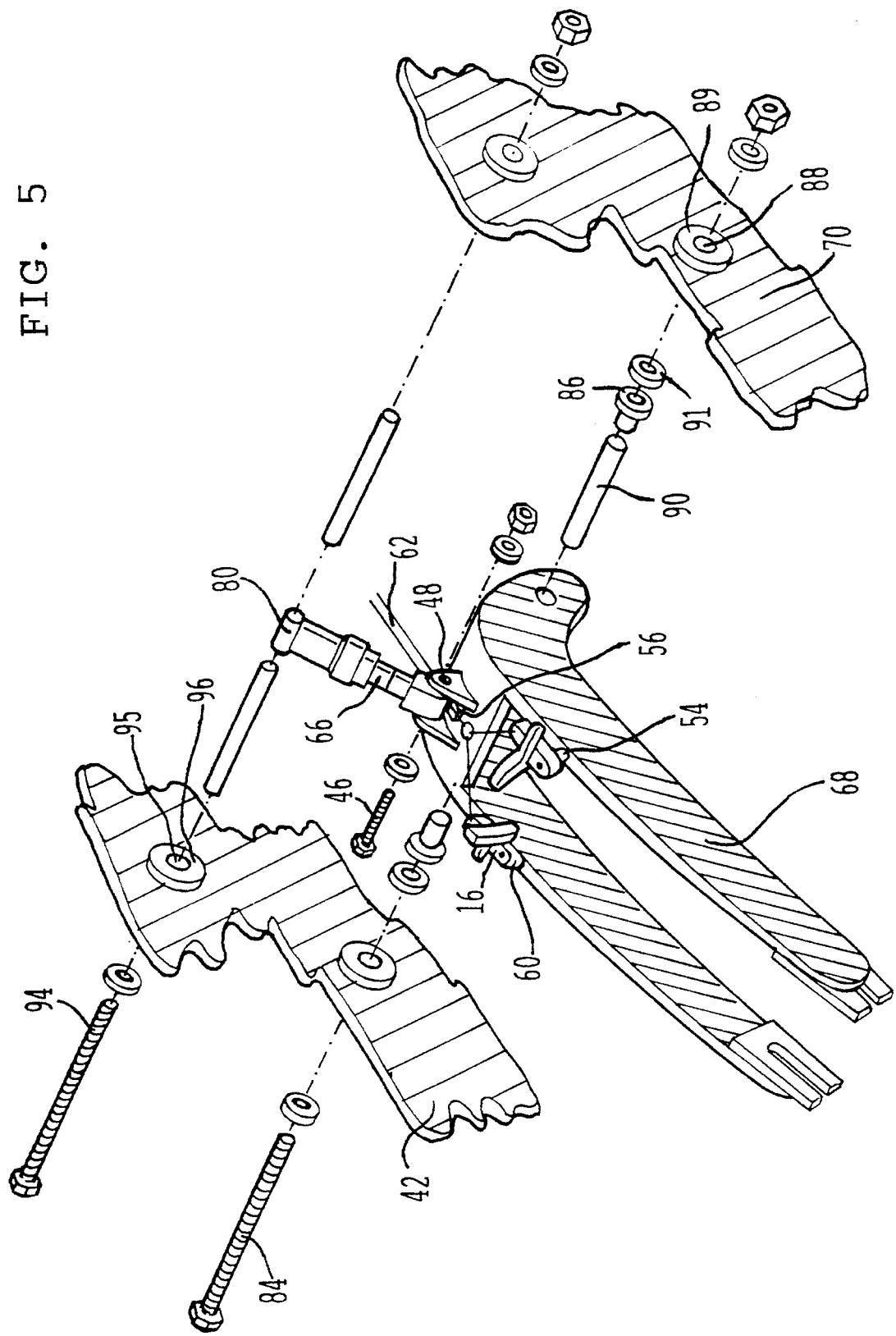
FIG. 5 is a detail of the rugged terrain cart showing, a rear ground engaging wheel, a rear cantilever brake, a rear wheel swingarm, a rear wheel shock absorber, and all related pivot and mounting means.

FIG. 5 is a detail of a preferred embodiment of my invention that shows the rear ground engaging wheel 64, which is of a mountain bicycle type, with a rim 76 and a tire 92 and an axle 10. The rear ground engaging wheel 64 is mounted by said axle 10 to a rear wheel swingarm 68 of a completely welded rigid structure of aluminum. The axle 10 may be affixed to the rear wheel swingarm 68 by means of any suitable means such as for example by means of a threaded nut. The rear wheel swingarm 68 interconnects the rear ground engaging wheel 64 with the rigid frame 74 by means of a swingarm pivot point mount 88 which mounts a swingarm bolt 84 that acts as the pivot point for the swingarm. The swingarm bolt 84 may be affixed to the swingarm pivot point mount 88 by means of any suitable means such as for example by means of a threaded nut. The swingarm pivot point mount 88 is a round hole, positioned in both a right side frame member 70 and the left side frame member 42 of the rigid frame 74, to accept the swingarm bolt 84. A swingarm pivot point mount reinforcing pad 89, a circular section of flat aluminum plate with a swingarm sized bolt hole in the center, is attached by welding means to the area of the rigid frame 74 surrounding the swingarm pivot point mount 88. Consisting of a set of four pieces, the swingarm pivot point mount reinforcing pad 89 is installed on the right side frame member 70 and the left side frame member 42 of the rigid frame 74, both on the inside and on the outside surfaces of the frame members. The swingarm bolt 84 mounts the rear wheel swingarm 68 by means of a swingarm flange bearing 86 mounted in each of the two sides of the swingarm and a swingarm plain cylindrical bearing 90 which is installed within the swingarm itself. In mounting the rear wheel swingarm 68 to the swingarm pivot point mount 88 of the rigid frame 74, a swingarm thrust bearing 91 is positioned on the swingarm bolt 84 adjacent to each swingarm flange bearing 86 mounted in the sides of the swingarm.

A rear wheel shock absorber 66, of the type found on modern mountain bicycles with swingarm rear suspension systems, mounts to the rear wheel swingarm 68 by means of a lower shock absorber mounting point 48 and a lower shock absorber mounting bolt assembly 46 which consists of a threaded bolt, a flat washer, and a threaded nut. The rear wheel shock absorber 66 mounts to the rigid frame 74 by means of an upper shock absorber mounting point 95, found in the right side frame member 70 and the left side frame member 42, and an upper shock absorber mounting bolt assembly 94. An upper shock absorber mounting point reinforcing pad 96, a circular section of flat aluminum plate with a mounting bolt sized hole in the center, is attached by welding means to the area of the rigid frame 74 surrounding the upper shock absorber mounting point 95. Consisting of a set of four pieces, the upper shock absorber mounting point reinforcing pad 96 is installed on the right side frame member 70 and the left side frame member 42 of the rigid frame 74, both on the inside and on the outside surfaces of the frame members. The upper shock absorber mounting bolt assembly 94, consists of a threaded bolt, a pair of flat washers, a threaded nut, and a pair of bolt-mounted spacers, that serve as a means of mounting the upper portion of the rear wheel shock absorber 66. The threaded bolt passes through and interconnects the upper shock absorber mounting point 95 on the right side frame member 70 of the rigid frame 74 and the upper shock absorber mounting point 95 on the left side frame member 42 of the rigid frame 74. In fastening the upper shock absorber mounting bolt assembly 94 to the upper shock absorber mounting point 95 on each side of the rigid frame 74, one of the flat washers is positioned on the upper shock absorber mounting point reinforcing pad 96 located on the outside surface of both the right side frame member 70 and the left side frame member 42. With the upper portion of the rear wheel shock absorber 66 mounted on the portion of the threaded bolt between the two sides of the rigid frame 74, it is centered laterally upon the bolt by the two bolt-mounted spacers of the upper shock absorber mounting bolt assembly 94.

The combination of the rear wheel swingarm 68 and the rear wheel shock absorber 66 serves to satisfy the role of a suspension means 80 for the rear ground engaging wheel 64.

A rear cantilever brake 60, of the type typically found on a modern mountain bicycle, is mounted to the rear wheel swingarm 68 by means of a rear brake bosses 54 arrangement, also of the type typically found on modern mountain bicycles, which is attached by welding means into the structure of the swingarm.

The rear cantilever brake 60 satisfies the role of a brake means 16 for the rear ground engaging wheel 64. A rear brake cable mount 56, of the type typically utilized on modern mountain bicycles, provides a mount for the lower portion of a rear brake control cable 62 and is attached by welding means into the structure of the rear wheel swingarm 68.

Operation—FIGS. 1 to 5

As is best shown in FIGS. 1, 2 and 3, the preferred embodiment of my invention, a rugged terrain cart 78, has a plurality of ground engaging wheels 52, specifically with a forward ground engaging wheel 18 and a rear ground engaging wheel 64. The two ground engaging wheels are arranged in an approximate in-line wheel position, in relation to the normal direction of forward travel, in order to stabilize and support the cart, and its workload, fore and aft in the longitudinal plane of the vehicle.

As is best shown in FIG. 1, in the preferred embodiment of my invention, the forward ground engaging wheel 18, which has a rim 76 and a tire 92 and an axle 10, is mounted by said axle 10 to a suspension front fork 82. The suspension front fork 82 satisfies the role of providing both a rigid forward wheel mounting assembly 72 and a suspension means 80 for the forward ground engaging wheel 18. The function of the suspension front fork 82 is to interconnect the forward ground engaging wheel 18 to a rigid frame 74 by means of a headset 40 which, in the preferred embodiment of my invention, satisfies the role of a pivot means 50. The headset 40 serves to provide the suspension front fork 82, and thus the forward ground engaging wheel 18, the ability to pivot to the right and to the left of the center, in-line wheel position in order to effect directional control of the vehicle. The suspension front fork 82 further provides vertical wheel travel and serves to provide compression, rebound, and dampening control as the suspension means 80 of the forward ground engaging wheel 18. A front cantilever brake 24 is mounted to a front brake bosses 20 arrangement which is incorporated into the structure of the suspension front fork 82. The function of the front cantilever brake 24 is to, upon the attendants command, act as a brake means 16 which inhibits or terminates the rotation of the forward ground engaging wheel 18, about its axle 10, in order to maintain control of the cart. A front fork brace 28, serves to stiffen the suspension front fork 82 and provides a mount for the lower portion of a front brake control cable 26. The function of the front brake control cable 26 is to interconnect a front brake lever assembly 22, which the attendant operates by hand, to the front cantilever brake 24, to facilitate the activation the front cantilever brake 24.

The upper portion of the suspension front fork 82 passes up through the headset 40 which mounts within a head tube 38 that is an integral member of the cart's rigid frame 74. Once the upper portion of the suspension front fork 82 passes through the headset 40, it is securely attached by a handle bar stem 32. The handle bar stem 32 further serves to provide a mount for a handle bar 34, which in the preferred embodiment of my invention, satisfies the role of a handle means 36. The handle bar 34 further serves as a mount for a hand grip set 30, a front brake lever assembly 22, and a rear brake lever assembly 58. The front brake lever assembly 22 and the rear brake lever assembly 58 each satisfy the role of a brake engaging means 14. With the forward ground engaging wheel 18 and the handle bar 34 interconnected in this fashion, the attendant is thus able to efficiently propel, steer, brake, and maneuver the rugged terrain cart 78.

In the preferred embodiment of my invention, the rigid frame 74 of the cart serves to interconnect the headset 40 with a rear ground engaging wheel 64 by means of a rear wheel swingarm 68. A swingarm pivot point mount 88, located on both a right side frame member 70 and a left side frame member 42 of the rigid frame 74, facilitates this interconnection. The swingarm pivot point mount 88 serves as a mounting hole for a swingarm bolt 84. To strengthen the swingarm pivot point mount 88, a swingarm pivot point mount reinforcing pad 89 is welded on the right side frame member 70 and the left side frame member 42 of the rigid frame 74, both on the inside and on the outside surfaces of each of the frame members. The swingarm bolt 84 serves to attach the rear wheel swingarm 68 to the rigid frame 74 by means of the swingarm pivot point mount 88 and further serves as the pivot point for the swingarm. The swingarm bolt 84 mounts the rear wheel swingarm 68 by means of a swingarm flange bearing 86 mounted in each side of the swingarm and a swingarm plain cylindrical bearing 90 which is installed within the swingarm itself. The swingarm flange bearing 86 and the swingarm plain cylindrical bearing 90, combined with a swingarm thrust bearing 91 positioned on the swingarm bolt 84 at each side of the swingarm, serve to provide both a rigid manner of attachment and a low friction pivot point between the rear wheel swingarm 68 and the swingarm bolt 84.

As is best shown in FIG. 5, in the preferred embodiment of my invention, the rear ground engaging wheel 64, which has a rim 76 and a tire 92 and an axle 10, is mounted to the rear wheel swingarm 68 by means of said axle 10. The function of the rear wheel swingarm 68 is to provide a rigid mounting for the rear ground engaging wheel 64 which further allows vertical wheel travel in order to accommodate a suspension means 80. The rear wheel swingarm 68 also provides a mounting for a rear brake bosses 54 arrangement, which mounts a rear cantilever brake 60, and a rear brake cable mount 56 which mounts the lower portion of a rear brake control cable 62. The function of the rear cantilever brake 60 is to, upon the attendants command, act as a brake means 16 which inhibits or terminates the rotation of the rear ground engaging wheel 64, about its axle 10, in order to maintain control of the cart. The function of the rear brake control cable 62 is to interconnect a rear brake lever assembly 58, which the attendant operates by hand, to the rear cantilever brake 60, to facilitate the activation of the rear cantilever brake 60.

A rear wheel shock absorber 66, which mounts to the upper shock absorber mounting point 95 on the rigid frame 74 and the lower shock absorber mounting point 48 on the rear wheel swingarm 68, serves to provide compression, rebound, and dampening control as a suspension means 80. The upper shock absorber mounting point 95 is strengthened with an upper shock absorber mounting point reinforcing pad 96 which is welded on the right side frame member 70 and the left side frame member 42 of the rigid frame 74, both on the inside and on the outside of each of the members. An upper shock absorber mounting bolt assembly 94, consisting of a threaded bolt, a pair of flat washers, a threaded nut, and a pair of bolt spacers, serves to attach the rear wheel shock absorber 66 to the upper shock absorber mounting point 95 in the right side frame member 70 and in the left side frame member 42 of the rigid frame 74. The threaded bolt passes through and interconnects the upper shock absorber mounting point 95 in the right side frame member 70 of the rigid frame 74 with the upper shock absorber mounting point 95 in the left side frame member 42 of the rigid frame 74. Aligned on the portion of the threaded bolt between the two sides of the rigid frame 74, having been centered laterally upon the shaft by the pair of bolt-mounted spacers, the upper portion of the rear wheel shock absorber 66 is mounted. During the course of the assembly, one flat washers is positioned on each of the two ends of the threaded bolt which is then secured to the rigid frame 74 with the threaded nut.

The lower shock absorber mounting point 48, located on the rear wheel swingarm 68, employs a lower shock absorber mounting bolt assembly 46, consisting of a threaded bolt, a flat washer, and a threaded nut to mount and secure the lower portion of the rear wheel shock absorber 66.

As shown in FIG. 4, the rigid frame 74 also serves as a mounting for an upper load attachment rail 93, consisting of a set of right side and left side members, and a lower load attachment rail 44, consisting of a set of right side and left side members. The load attachment rails are mounted on both the right side frame member 70 and the left side frame member 42 in order to provide an efficient means of attaching a workload, typically loads placed into self-contained carriers, a backpack 12, upon the right side and/or the left side of the rigid frame 74 by means of nylon webbing or rope.

As is best shown in FIG. 1, within the rigid frame 74 a sealed interior compartment serves as a waterproof storage means 98 to provide waterproof storage for a portion of the cart's workload. A waterproof access hatch 97 is installed in the left side frame member 42 of the rigid frame 74 and serves to provide accessibility to the waterproof storage means 98 and its workload.

The rugged terrain cart 78 is intended as a vehicle for the transportation of a workload over rugged terrain by a single attendant. In operation, a single attendant walks beside the cart, either on the right or on the left side of the rigid frame 74, while holding the hand grip set 30 with his or her hands, in order to effect propulsion, steering, and maneuvering of the vehicle.

With workloads carried in self-contained carriers, backpack 12, that are attached to the cart's rigid frame 74 by means of the upper and the lower load attachment rails, the workload may be strategically positioned anywhere along the surface area of the rigid frame 74. It is usually most advantageous for the bulk of the workload to be positioned upon the side of the rigid frame 74 which opposes the side from which the attendant has selected to operate the vehicle. This positioning of the workload allows the attendant to walk unhindered while in extremely close proximity to the rigid frame 74 of the cart and facilitates the efficient operation of the vehicle, especially when traversing narrow trails. Although the weight of the workload will generally be positioned as low as practical to provide the cart with a low center of gravity, no portion of the load is intended to extend below the axle 10 height of either of the ground engaging wheels in order to provide ample brush and obstacle clearance.

As previously discussed, the cart also offers additional load carrying ability in the form of the waterproof storage means 98 contained within the rigid frame 74 of the vehicle.

Summary, Ramifications, and Scope

Thus the reader will see that the rugged terrain cart of the invention reveals a new and unique design with a plurality of ground engaging wheels positioned in an approximate in-line arrangement which provides a highly desirable improvement upon the presently available carts by supporting and balancing the cart, and the weight of its workload, along the longitudinal plane of the vehicle. The result is one of relieving the attendant from the hardships associated with the burdensome force that would otherwise be placed upon the user's hands, arms, and back.

Additionally, the cart of the invention, by virtue of the working combination of its handle means, rigid forward wheel mounting assembly, forward ground engaging wheel, and pivot means, provides a high degree of maneuverability, ease and precision in steering, and an efficient position of operation and propulsion for the carts attendant.

Furthermore, the cart of the invention, by virtue of its rigid frame and large load carrying surface area, will accommodate loads of both a large quantity and those which are heavy in weight, provide a low center of gravity for enhanced stability by means of the purposeful attachment and positioning of the workload in a manner which is consistent with this goal, and serve to prevent the workload or brush and tree branches from becoming intertwined with a ground engaging wheel.

Although the description above contains many specifications, these should not be construed as limiting the scope of the invention but as merely providing illustrations of some of the presently preferred embodiments of this invention. For example, another embodiment of the cart of the invention may encompass an additional number of the approximate in-line ground engaging wheels beyond the two wheel configuration which is illustrated in the preferred embodiment; a mountain bicycle type suspension handle bar stem which provides a more comfortable and less fatiguing handle means may be substituted for the rigid mountain bicycle handle bar stem which is illustrated in the preferred embodiment; the suspension means illustrated in the preferred embodiment may be eliminated on one or more of the ground engaging wheels in favor of a less complex, rigid wheel mounting means; the rigid frame may be constructed of composite, plastic, and glass reinforced plastic, materials rather than the welded aluminum alloy described in the preferred embodiment; the cart of the preferred embodiment may further include an engine mounted in said rigid frame for producing rotational energy, and a means for controllably coupling rotational energy from said engine to at least one of said ground engaging wheels, so as to assist the attendant in propelling said rugged terrain cart along a surface.

Thus the scope of the invention should be determined by the appended claims and their legal equivalents, rather than by the examples given.

I claim:

1. A rugged terrain cart, being attendant propelled, for the carrying a workload comprising:

a plurality of ground engaging wheels, the ground engaging wheels being positioned in an approximate in-line wheel position in relation to the normal direction of forward travel, with a forward ground engaging wheel and a rear ground engaging wheel, a rigid forward wheel mounting assembly which provides a mount for said forward ground engaging wheel, a pivot means interconnecting said rigid forward wheel mounting assembly to a rigid frame so as to allow said rigid forward wheel mounting assembly and said forward ground engaging wheel the means to pivot to the right and to the left of the normal in-line wheel position about an approximate vertical axis in relation to the lateral plane of the cart, a handle means, adapted to be grasped by the hands of the attendant, which is interconnected to said rigid forward wheel mounting assembly, said rigid frame being of monocoque construction, the exterior surface of said rigid frame being fully functional and advantageous in respect to the attachment and transportation of a workload, said rigid frame having a left side frame member and a right side frame member, said left side frame member and said right side frame member extending longitudinally so as to define a substantially horizontal workload supporting platform atop said rigid frame which extends from a position approximately level and adjacent said handle means to the rearmost portion of the cart, said right side frame member having a upper load attachment rail and a lower load attachment rail, said left side frame member having said upper load attachment rail and said lower load attachment rail, said rigid frame forming an interior storage area, a waterproof storage means, being fully functional and advantageous in respect to the storage of a workload and being accessible by virtue of, a waterproof access hatch, being of the type utilized as marine waterproof inspection ports, said waterproof access hatch being mounted within a section of said rigid frame selected from the group consisting of said right side frame member and said left side frame member, said handle means, being adapted to be grasped by the hands of the attendant while walking along beside said rugged terrain cart, serving to provide the attendant the ability to effect control over the cart while in use, whereby the attendant, as a nonoccupant, may easily, efficiently and precisely propel, steer, and maneuver the cart and transport heavy loads without having to exert a burdensome force in order to balance the cart, and the workload, fore and aft along the longitudinal plane of the vehicle.

2. The cart of claim 1 further including a brake means employing a pair of mechanisms for engaging and acting upon said front ground engaging wheel and said rear ground engaging wheel comprising:

(a) said brake means mounted in operable association with said front ground engaging wheel and a front brake control cable extended with a front brake lever assembly mounted at a remote end thereof in association with said handle means, the lever being manipulable to operate said brake means to slow or terminate rotation of said front ground engaging wheel during movement, (b) said brake means mounted in operable association with said rear ground engaging wheel and a rear brake control cable extended with a rear brake lever assembly mounted at a remote end thereof in association with said handle means, the lever being manipulable to operate said brake means to slow or terminate rotation of said rear ground engaging wheel during movement.

3. The cart of claim 2 wherein:

(a) said rigid forward wheel mounting assembly contains a suspension means for causing it to operate with a shock absorbing mechanism to provide vertical wheel travel with compression, rebound, and dampening control for said forward ground engaging wheel, (b) the mounting for said rear ground engaging wheel contains said suspension means for causing it to operate with a shock absorbing mechanism to provide vertical wheel travel with compression, rebound, and dampening control for the rear wheel.

4. The cart of claim 1 wherein:

(a) said rigid forward wheel mounting assembly contains a suspension means for causing it to operate with a shock absorbing mechanism to provide vertical wheel travel with compression, rebound, and dampening control for said forward ground engaging wheel, (b) the mounting for said rear ground engaging wheel contains said suspension means for causing it to operate with a shock absorbing mechanism to provide vertical wheel travel with compression, rebound, and dampening control for the rear wheel.

5. A rugged terrain cart, being attendant propelled, for the carrying a workload comprising:

a plurality of ground engaging wheels, the ground engaging wheels being positioned in an approximate in-line wheel position in relation to the normal direction of forward travel, with a forward ground engaging wheel and a rear ground engaging wheel, a rigid forward wheel mounting assembly which provides a mount for said forward ground engaging wheel, a pivot means interconnecting said rigid forward wheel mounting assembly to a rigid frame so as to allow said rigid forward wheel mounting assembly and said forward ground engaging wheel the means to pivot to the right and to the left of the normal in-line wheel position about an approximate vertical axis in relation to the lateral plane of the cart, a handle means, adapted to be grasped by the hands of the attendant, which is interconnected to said rigid forward wheel mounting assembly, said rigid frame being of monocoque construction, the exterior surface of said rigid frame being fully functional and advantageous in respect to the attachment and transportation of a workload, said rigid frame having a left side frame member and a right side frame member, said left side frame member and said right side frame member extending longitudinally so as to define a substantially horizontal workload supporting platform atop said rigid frame which extends from a position approximately level and adjacent said handle means to the rearmost portion of the cart, said rigid frame having a workload attachment means for attaching the workload to the exterior surface of the frame, said rigid frame forming an interior storage area, a waterproof storage means, being fully functional and advantageous in respect to the storage of a workload and being accessible by virtue of, a waterproof access hatch, being of the type utilized as marine waterproof inspection ports, said waterproof access hatch being mounted within a section of said rigid frame selected from the group consisting of said right side frame member and said left side frame member, said handle means, being adapted to be grasped by the hands of the attendant while walking along beside said rugged terrain cart, serving to provide the attendant the ability to effect control over the cart while in use, whereby the attendant, as a nonoccupant, may easily, efficiently and precisely propel, steer, and maneuver the cart and transport heavy loads without having to exert a burdensome force in order to balance the cart, and the workload, fore and aft along the longitudinal plane of the vehicle.

6. The cart of claim 5 further including a brake means employing a pair of mechanisms for engaging and acting upon said front ground engaging wheel and said rear ground engaging wheel comprising:

(a) said brake means mounted in operable association with said front ground engaging wheel and a front brake control cable extended with a front brake lever assembly mounted at a remote end thereof in association with said handle means, the lever being manipulable to operate said brake means to slow or terminate rotation of said front ground engaging wheel during movement, (b) said brake means mounted in operable association with said rear ground engaging wheel and a rear brake control cable extended with a rear brake lever assembly mounted at a remote end thereof in association with said handle means, the lever being manipulable to operate said brake means to slow or terminate rotation of said rear ground engaging wheel during movement.

7. The cart of claim 6 wherein:

(a) said rigid forward wheel mounting assembly contains a suspension means for causing it to operate with a shock absorbing mechanism to provide vertical wheel travel with compression, rebound, and dampening control for said forward ground engaging wheel, (b) the mounting for said rear ground engaging wheel contains said suspension means for causing it to operate with a shock absorbing mechanism to provide vertical wheel travel with compression, rebound, and dampening control for the rear wheel.

8. The cart of claim 5 wherein:
(a) said rigid forward wheel mounting assembly contains a suspension means for causing it to operate with a shock absorbing mechanism to provide vertical wheel travel with compression, rebound, and dampening control for said forward ground engaging wheel, (b) the mounting for said rear ground engaging wheel contains said suspension means for causing it to operate with a shock absorbing mechanism to provide vertical wheel travel with compression, rebound, and dampening control for the rear wheel.

* * * * *